United States Patent [19]
Davis

[11] Patent Number: 5,181,434
[45] Date of Patent: Jan. 26, 1993

[54] APPARATUS AND METHOD FOR REFURBISHING A DRIVE TUMBLER

[76] Inventor: Verlon L. Davis, 1736 Winewood Rd., Birmingham, Ala. 35215

[21] Appl. No.: 802,851

[22] Filed: Dec. 6, 1991

[51] Int. Cl.⁵ .................. F16H 55/12; B23P 6/00
[52] U.S. Cl. ................... 74/447; 29/402.12; 29/402.15
[58] Field of Search ............ 74/446, 447, 448; 29/402.9, 402.11, 402.12, 402.13, 402.15, 893

[56] References Cited
U.S. PATENT DOCUMENTS

| | | | |
|---|---|---|---|
| 408,435 | 8/1889 | Redington | 74/448 |
| 1,206,172 | 11/1916 | Thomas | 74/448 |
| 2,707,884 | 5/1955 | Boisvert | 74/448 |

Primary Examiner—Allan D. Herrmann
Attorney, Agent, or Firm—Jennings, Carter, Thompson & Veal

[57] ABSTRACT

An improved tumbler for use in pad driven machinery or the like utilizes a plurality of replaceable wear members mounted to a reel assembly on the conventional tumbler hub. The wear members engage the cleats of the pads to impart relative motion and bear the brunt of the wear generated thereby. The wear members are designed to wear faster than the cleat or reel assembly and are mounted for relatively easy replacement, thus eliminating replacement of worn tumblers.

13 Claims, 3 Drawing Sheets

APPARATUS AND METHOD FOR REFURBISHING A DRIVE TUMBLER

FIELD OF THE INVENTION

The present invention relates to heavy equipment in general and more particularly to pad drive type heavy equipment wherein a drive pad is engaged with a driven tumbler to induce relative motion. Even more particularly the present invention relates to the construction and repair of such tumblers in such equipment

BACKGROUND OF THE INVENTION

Many items of heavy machinery such as used in mining operations utilize driven pads which carry a plurality of drive members on their inner surface. These members are engaged by the drive tumbler of the machine to induce relative motion between the pad and the machine. An example of this type machinery is the Hitachi ® 3500 XE. Heretofore, it was determined to be less expensive and less time-consuming to replace the drive tumblers than to replace the pad in this type machinery. Therefore, the drive members on the pads have been made to withstand the wear of engagement and disengagement with the tumbler, whereas the tumblers readily become worn and must be replaced. As might be imagined the replacement of a metal wheel five feet in diameter and ten inches thick is not an easy task. However, the wear at the point of contact between the pad drive members and the tumbler (wheel) necessitates the frequent replacement thereof Accordingly, there exists a need for a construction of such tumblers which would substantially reduce the effort and time required to repair worn surfaces on the tumblers.

SUMMARY OF THE INVENTION

It is the object of the present invention to provide a construction for a new or rebuilt tumbler which will enable the tumbler to be rapidly and easily repaired and will substantially eliminate the need for replacement of these components except in cases of gross abuse of the machinery.

A further object is to provide a method of rebuilding tumbler drive wheels such that their useful life may be extended indefinitely.

In furtherance of these and other objects and goals I have developed a construction for a tumbler drive that accommodates the requisite wear characteristics associated with the drive member and tumbler and allows the wearing action therebetween to be absorbed by a replaceable component. This replaceable component is carried by the tumbler and is in effect a liner for the tumbler.

BRIEF DESCRIPTION OF THE DRAWINGS

Apparatus embodying features of my invention are depicted in the accompanying drawings which form a portion of this disclosure and wherein:

FIG. 7 is a partial sectional view of a second embodiment; and

FIG. 8 is a plan view of the wear member of FIG. 9.

DESCRIPTION OF A PREFERRED EMBODIMENT

Figure 1:
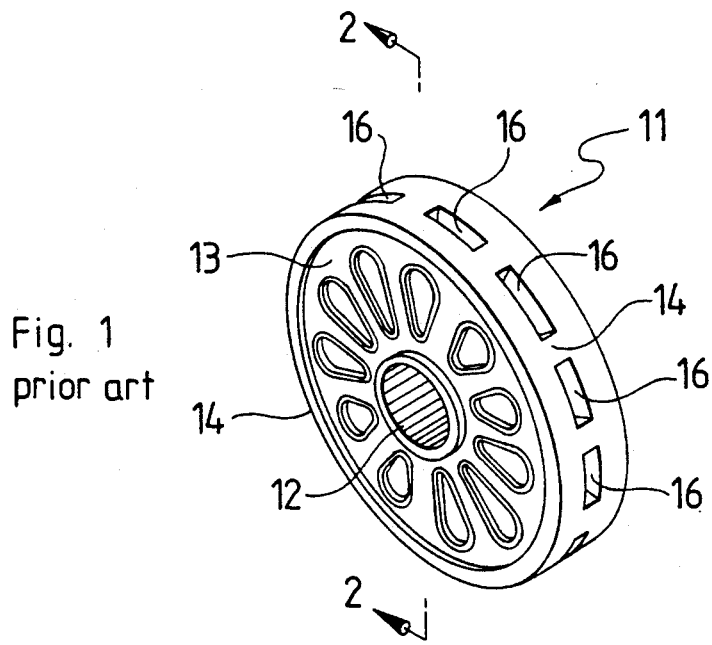
FIG. 1 is a perspective view of a conventional prior art tumbler.
Figure 2:
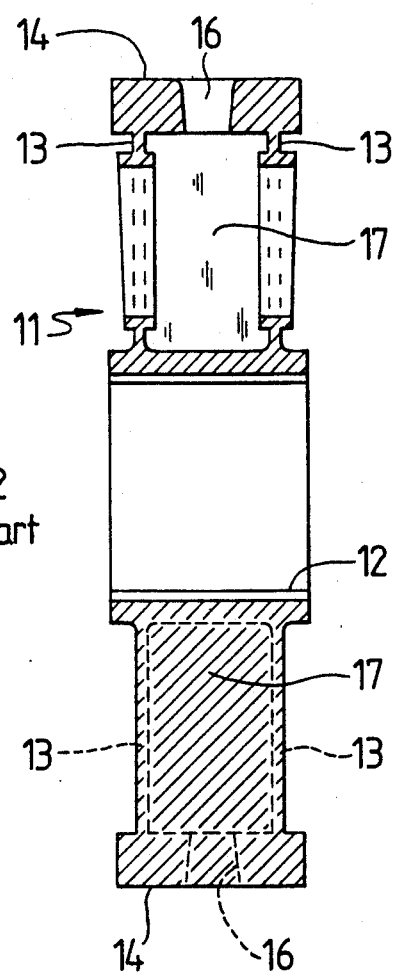
FIG. 2 is a sectional view taken along line 2—2 of FIG. 1 showing an unworn prior art tumbler.
Figure 3:
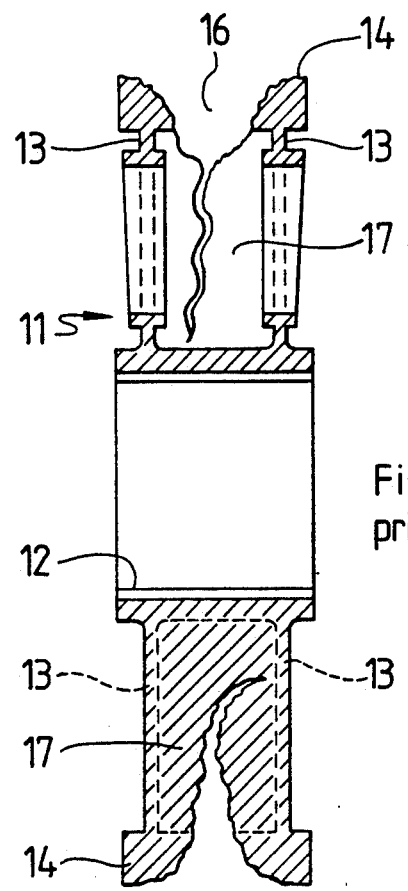
FIG. 3 is a sectional view taken along the same line as FIG. 2 depicting the effects of wear on a prior art tumbler.

Referring to FIG. 1, a conventional tumbler 11 of the prior art is shown. As will be noted the tumbler includes an internally splined hub 12 and a pair of radially extending web members 13 which are connected about their periphery by an annular portion 14 which has formed therein a plurality of spaced apart openings 16 which receive therewithin the drive members affixed to an associated pad. In FIG. 2 an unworn tumbler 11 of the prior art is shown in section, illustrating a set of interconnecting gussets 17. In FIG. 3, a worn prior art tumbler is shown As illustrated the opening 16 has been widened by wearing away the web 13 on either side and lengthened by wearing away the annular portion 14. Frequently the gussets 17 will be found to be worn and cracked as shown, thus it is clear that such a worn tumbler is unable to achieve sufficient traction and must be replaced.

Figure 4:
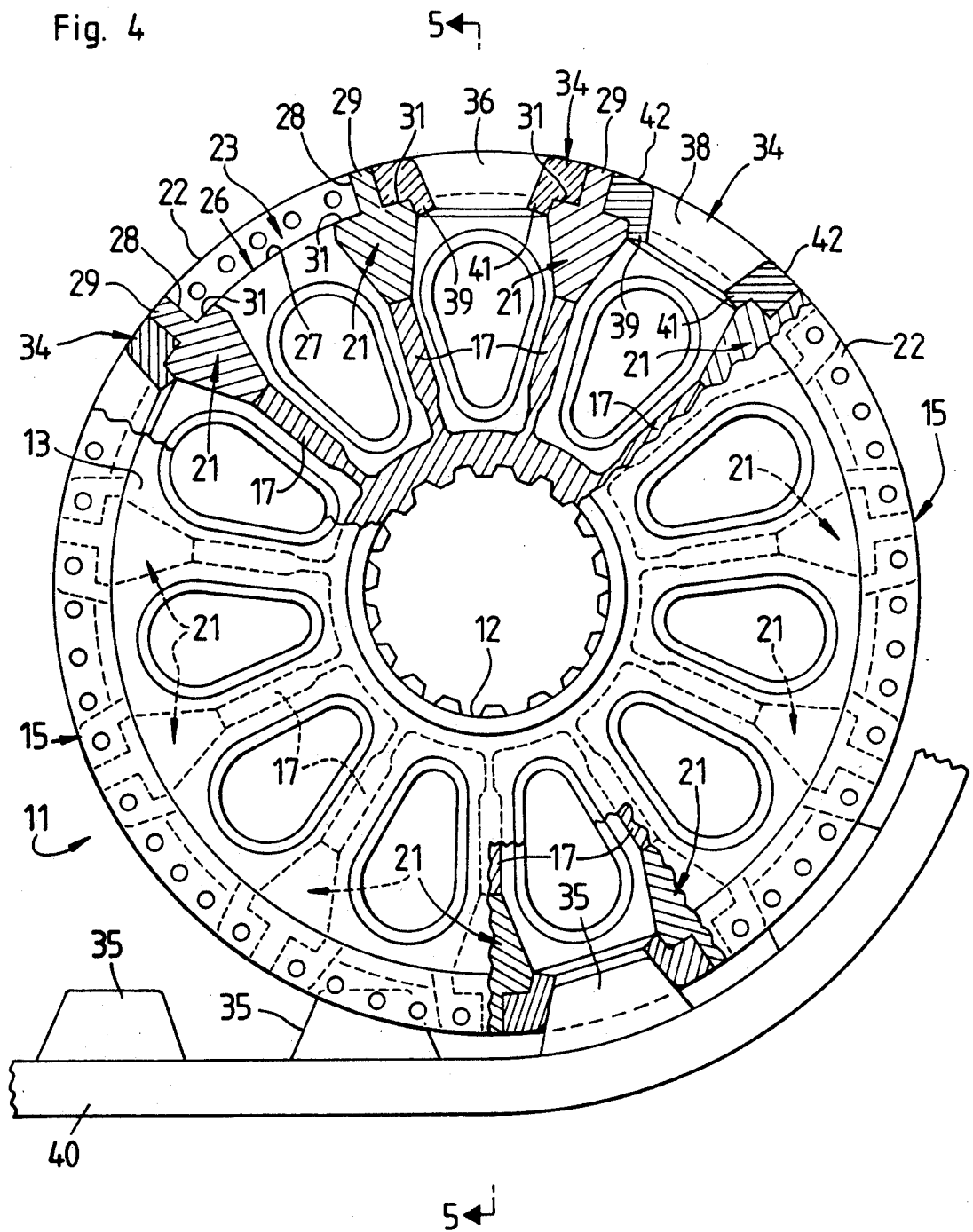
FIG. 4 is a side elevational view of my improved tumbler construction partially in section to show the interior thereof.
Figure 5:
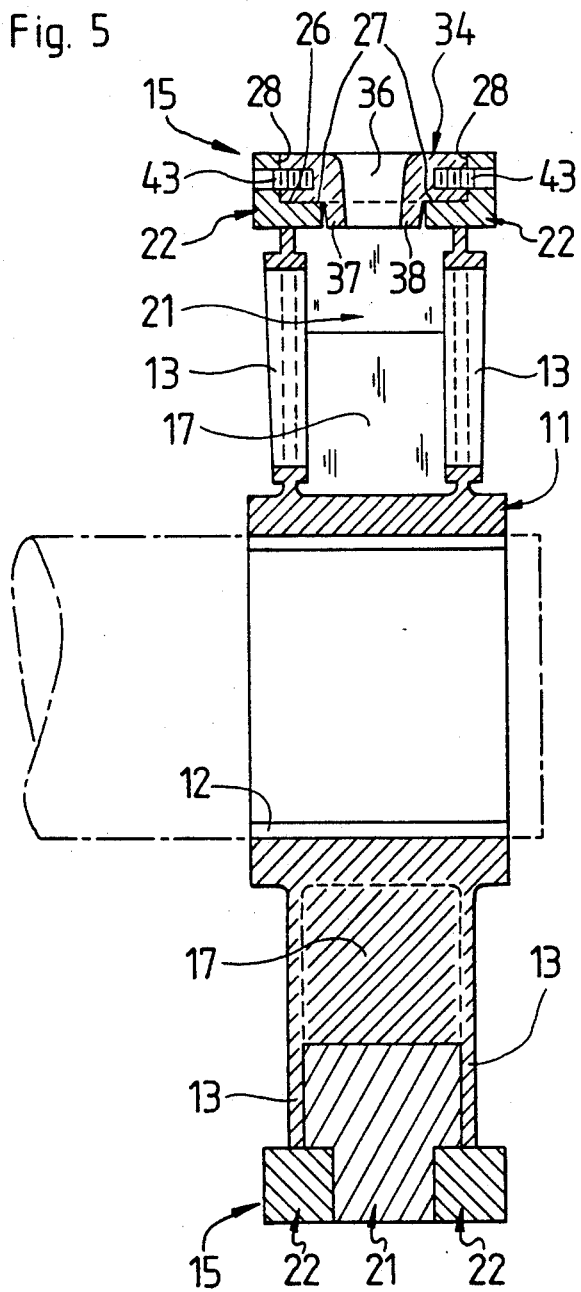
FIG. 5 is a sectional view of my tumbler construction as taken along line 5—5 of FIG. 4.

With reference to FIGS. 4 and 5, my improved construction for tumbler drives utilizes the hub 12 and splines of the conventional tumbler and is thus directly usable on existing tumbler drive machinery. As may be seen the existing gusset members 17 of a worn tumbler are shortened to their maximum usable length and a supplemental gusset 21 is affixed to the remaining gusset 17 and the web 13. The periphery of the web 13 is replaced by a pair of rails 22 to give the tumbler the same diameter as the original tumbler. As may be seen in FIGS. 4 and 5, rails 22 circumscribe the web 13 and form a reel member 15. At regular spaced intervals about the rails a receptacle or opening 23 is defined intermediate a pair of supplemental gussets 21. More particularly, at each such opening each rail 22 has a portion thereof removed to define a seat 26. The seat 26 is formed by an arcuate bottom surface 27 having the same curvature as the rails and a radially extending side 28. Each supplemental gusset 21 is flared upwardly and outwardly toward the rails. The outermost portion of the supplemental gusset 21 forms a rabbet 29 and extends between the rails. At the innermost part of the rabbet 29 a seating surface 31 is formed on the gusset with surface 31 extending from one rail to the other at the same radial distance as surface 27. Thus surfaces 27 and 31 form a peripheral seat about an opening 23 between the rails 22 and the supplemental gussets 21.

Figure 6:
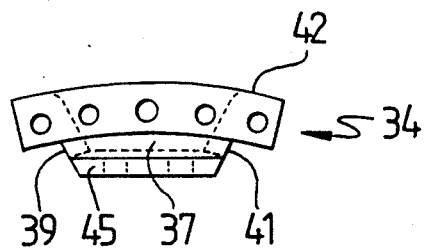
FIG. 6 is a side elevational view of a wear member as used in the tumbler shown in FIG. 5.
Figure 7:
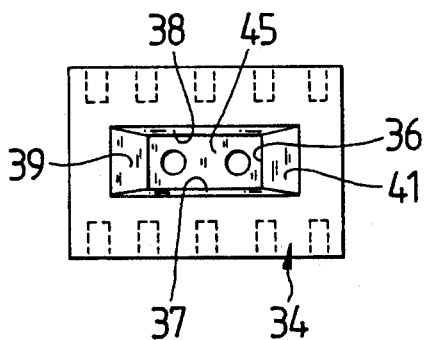
FIG. 7 is a plan view of the wear member of FIG. 6.
Figure 8:
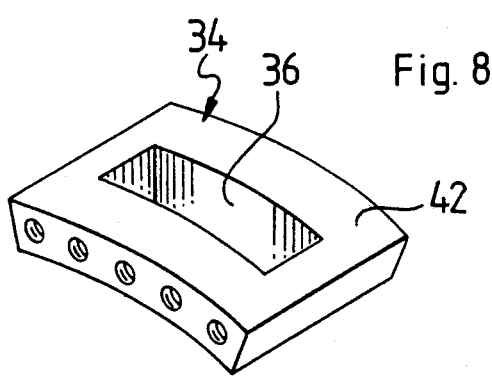
FIG. 8 is a perspective view of a wear member as used in the tumbler shown in FIG. 5.
Figure 9:
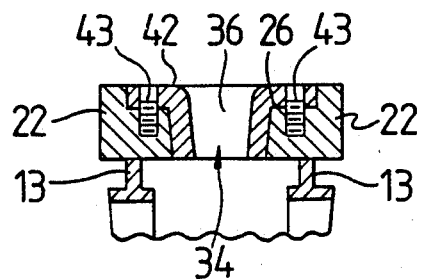
Figure 10:
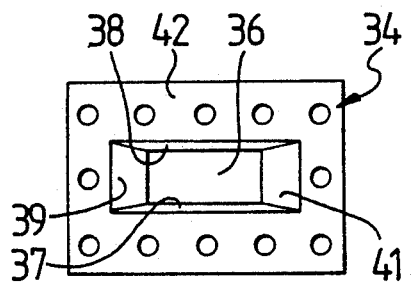

Received within each opening 23 is a wear member 34 formed from a metal with a wear characteristic which is sufficiently less durable than the pad mounted drive members 35 that the wear member 34 is worn to the point of needing replacement before any appreciable wear in the rails or drive members can occur. For example, the wear members may be made of a low alloy contact material in a tempered condition and the drive members 35 may be made from much more durable material. Each wear member 34 forms a receptacle 36 for the drive member 35 or cleats on the drive pad 40, thus the wear members 34 are formed with an outwardly flared opening extending therein. Each wear member 34 has a pair of side walls 37 and 38 which diverge slightly radially and a pair of end walls 39 and 41 which diverge from the center of the tumbler. Each side wall 37 or 38 and each end wall 39 and 41 forms an internal shoulder which extends peripherally about the wear member and rests on the seat surfaces 27 and 31. The wear members 34 are dimensioned to fit precisely within the seats formed in the reel assembly with the upper surface 42 thereof being flush with the outer circumference of the rails. As seen in FIGS. 5-7 the wear members 34 are secured in place by a plurality of threaded connectors 43 which extend axially through the rails 22 and engage the wear members 34. A resin based locking compound may be applied to the connector to prevent their inadvertent loosening. In the embodiment of FIGS. 9 and 10 the threaded connectors 43 extend radially through the wear members 34 to engage the rails 22 to secure the wear member in place. It may also be advisable to include an apertured bottom plate 45 in the wear member 34 as shown in FIGS. 6 and 7 to ensure the integrity of the wear member which allows debris to pass through the wear member.

It will be appreciated that when a conventional tumbler is worn to the extent shown in FIG. 3 such that replacement is necessary, the hub of the tumbler, the usable portion of the web and a portion of the gusset may be salvaged and the tumbler rebuilt using my construction. Likewise, it should be noted that completely new tumblers using my construction may be built and used as replacement tumblers or original equipment tumblers. In either event, it is to be understood that once my construction is employed it should no longer be necessary to replace the tumblers. Rather, routine maintenance inspections should allow the operators of equipment utilizing such tumblers to identify worn wear members and replace them before any significant damage is done to the reel assembly. It should be noted that on a sixty-inch diameter tumbler the wear members are about twenty-six inches long, ten inches wide and four inches thick with a cleat receiving hole therethrough. Thus it will be much easier to remove the threaded connector and replace the wear members than it is to remove the entire drive tumbler and replace it with a new tumbler.

While I have shown my invention in two forms, it will be obvious to those skilled in the art that it is not so limited but is susceptible of various changes and modifications without departing from the spirit thereof.

What I claim is:

1. An improvement in a drive tumbler moving a drive pad wherein said drive pad includes a plurality of drive cleats which are engaged about the circumference of said tumbler, said tumbler including a plurality of radially extending support members mounted on a central hub for connection to a drive mechanism, the improvement comprising:
   (a) a circumferential reel member defining a plurality of angularly spaced outwardly facing openings therein said openings having a dimension substantially larger than said drive cleats; and
   (b) a plurality of wear members detachably affixed within each of said openings having an outwardly flared opening formed therein for receiving said cleats.

2. The improvement as defined in claim 1 wherein said wear members have a wear characteristic less than said cleats.

3. The improvement as defined in claim 1 further comprising means for selectively attaching and detaching each of said plurality of wear members to said reel member.

4. The improvement as defined in claim 1 wherein each of said plurality of wear members comprises a pair of side walls having the same curvature as said reel member and tapering slightly inwardly and a pair of end walls integrally formed with said side walls and transversely thereto with said walls tapering inwardly, said side walls and end walls forming an external circumferential shoulder which engages a seat formed in said reel member.

5. The improvement as defined in claim 4 further comprising a plurality of threaded members extending paraxially through said reel member and threadedly engaging said side walls above said shoulder to secure said wear member to said reel member.

6. The improvement as defined in claim 4 further comprising a plurality of threaded members extending radially through said wear member and threadedly engaging said seat to secure said wear members to said reel member.

7. Apparatus for reconditioning a worn drive tumbler for a pad drive comprising:
   (a) a reel assembly adapted for affixation to a hub of a worn drive tumbler wherein said hub and a portion of a plurality of radial gussets support said reel assembly for engagement with said pad drive; and
   (b) a plurality of wear members detachably secured within a plurality of angularly spaced apertures defined by said reel assembly.

8. Apparatus as defined in claim 7 wherein said reel assembly comprises a pair of parallel circular rails defining a plurality of angularly spaced inwardly facing seats therein said rails and said seats being spaced apart by a plurality of gusset members each affixed to said rails intermediate said seats such that said seats and gussets define a series of angularly spaced apertures in said reel assembly.

9. The apparatus as defined in claim 8 wherein each of said wear members comprise a pair of side portions having substantially the same curvature as said reel member, said side portions converging inwardly toward said hub; a pair of end portions formed with said side portion and converging toward said hub, said side portions and end portions forming a circumferential shoulder which rests on each of said seats.

10. The improvement as defined in claim 9 wherein said wear members have a wear characteristic less than said pad drive clears.

11. The apparatus as defined in claim 10 further comprising a plurality of threaded members extending paraxially through said reel member to threadedly engage said wear members to hold said wear members in place.

12. The apparatus as defined in claim 10 further comprising a plurality of threaded members extending radially through said wear members and threadedly engaging said reel member to hold said wear members thereto.

13. A method of refurbishing a drive tumbler comprising the steps of:

(a) reducing the diameter of said drive tumbler by removing from the periphery thereof substantially all of the material exhibiting wear thereto;
(b) affixing to said tumbler a plurality of radially extending gussets, partially replacing the removed material;
(c) affixing to said gussets a reel member having a plurality of opposing outwardly facing seats formed therein, said seats being angularly spaced apart and said reel member being held in parallel spaced relation by said gussets; and
(d) detachably affixing a plurality of wear members to said reel member, each wear member of said plurality being received in a pair of opposing seats in said reel member.

* * * * *